United States Patent
Rostad

[11] 3,897,695
[45] Aug. 5, 1975

[54] LINKAGE SYSTEM, PARTICULARLY FOR AIRCRAFT CONTROL

[75] Inventor: Nels C. Rostad, Glendale, Calif.

[73] Assignee: Lockheed Aircraft Corporation, Burbank, Calif.

[22] Filed: Feb. 6, 1974

[21] Appl. No.: 439,995

[52] U.S. Cl. .................... 74/516; 74/518; 74/567; 244/83 D
[51] Int. Cl.² .......................................... G05G 7/04
[58] Field of Search ............ 74/518, 516, 567, 569; 244/83 D

[56] References Cited
UNITED STATES PATENTS

| | | | |
|---|---|---|---|
| 2,076,965 | 4/1937 | Sawtelle | 74/518 |
| 3,086,406 | 4/1963 | Voser | 74/518 |
| 3,727,481 | 4/1973 | Nicholson | 74/516 X |
| 3,732,749 | 5/1973 | Thatcher et al. | 74/518 |

Primary Examiner—Samuel Scott
Assistant Examiner—F. D. Shoemaker
Attorney, Agent, or Firm—Billy G. Corber; William Kovensky; Lowell G. Turner

[57] ABSTRACT

A linkage, particularly for an aircraft control surface utilizing an arrowhead cam and a follower member. The shape of the arrowhead in cooperation with the location of the pivot points of this cam and of the follower predetermines the output motion of the follower in response to input motion on the arrowhead cam. The linkage produces a variable gain; i.e., a different output response at the follower for the same increment of input motion at different places in the total range of input motion.

11 Claims, 7 Drawing Figures

LINKAGE SYSTEM, PARTICULARLY FOR AIRCRAFT CONTROL

BACKGROUND OF THE INVENTION

This invention pertains to a linkage for converting an input motion into an output motion in accordance with predetermined relationships contained in the linkage.

More in particular, the invention was developed in and for the aircraft environment, particularly for flight control systems, such as controlling elevators, spoilers, flaps, and the like airfoils.

As is known, such systems, at least in larger aircraft, include power assist means, such as hydraulic servos. As an incident to such servos, control systems such as the invention typically include feedback means known as "feel simulators." The purpose is to provide a back force on the input control linkage to the pilot in order to satisfy the human need for such feedback. That is, a completely non-resistant control stick would be uncomfortable for a human operator, and the feel simulator provides that resistant force. The invention linkage includes such feel simulator means.

The invention linkage provides a variable response of output motion at different parts of the total range of input motion. That is, at some parts of the range of input motion it is desirable to have a relatively high gain; i.e., a relatively large response to a relatively small input motion. In other areas it is desirable to have the opposite condition; i.e., a relatively small output response to a relatively large input. A one-to-one response is desired and occurs between these ranges.

Heretofore, aircraft were provided with so-called ratio changing means interposed between the pilot's motion input means and the control surface servos. The invention eliminates all such means, which is one of its important advantages. The ratio changing means were relatively expensive, relatively heavy, were often not capable of operation in both directions from "stick neutral," and were another demand on the pilot in controlling the aircraft. That is, the pilot had to adjust the ratio changing means in order to produce the desired ratio of input-to-output at any particular point in time or during any particular maneuver. The invention overcomes this disadvantage by both eliminating the separate ratio changing means, and providing automatic changes in ratio in response to the position of the input control means.

The manual selection of input-to-output control motion is largely unnecessary under ordinary conditions because the range of motion during cruise will almost invariably fall within a certain part of the total input control range. Similarly, this ratio during takeoff and landing will also fall in the same area of the total range. These normal ranges are built into the invention linkage when embodied in any particular aircraft. It is this "building-in" of predetermined ratios for a particular aircraft which is an important advantage of the invention.

Aircraft control requires enormous flexibility in order to accommodate all possible flight situations, such as are caused by differing speeds, and the like. For this reason, it is thought that the invention linkage would not be used alone, but rather would be used together with a portion of present ratio changing means, specifically, the portion thereof which provides the manual selectivity of ratio. In this manner, the pilot could provide a high gain, for example, in a situation where the invention built-in logic and normal flight conditions would provide only a low gain; and vice versa; this to provide full flexibility.

The invention comprises a cam and a follower interposed between the pilot's input linkage of whatever type is being used, and the servos for the control surface of the aircraft to be controlled by that pilot input motion. The cam is on the input side and comprises a so-called "arrowhead" cam. The follower is driven by the arrowhead cam, and has a portion which drives the input to the servos, and another portion which cooperates with the feel simulator means.

An important advantage of the invention is that it operates in both directions; i.e., both forward and aft of stick neutral. Additionally, the gain characteristic in each direction is separately predeterminable by changing the arrowhead configuration. Prior ratio changers did not usually have this dual ability, or else could only provide this duality at relatively great expense in linkage complexity. Thus, at least in aircraft, this duality is a substantial step forward achieved by the invention.

Another advantage of the invention can be seen to reside in its extreme simplicity. An embodiment would comprise simply two members, the shape of the arrowhead cam, and/or the follower, with the pivot point locations, being suitably adjusted for the particular operating characteristics and ratios desired.

The invention can be used to cascade control motions. For example, in aircraft, it is often desirable to mix aileron and spoiler motions when it is desired to roll the aircraft in flight. At the same time, it is desired that the spoilers do not respond to aileron motion during normal flight and maneuvering less severe than a desired strong rolling maneuver. In such a use, the normal control inputs to the ailerons would be paralleled and also used as the input, via the invention linkage, to the spoilers. Thus, for relatively small normal aileron control motions, the spoilers would not respond at all or would respond with negligible motion. However, when a strong roll is desired, the relatively strong inputs to the ailerons will also produce a strong input, via the invention high gain portion, to the appropriate spoiler to enhance the roll and speed the response of the aircraft.

Thus, the variable gain feature of the invention could be advantageously used in this type of cascade control scheme, in aircraft as well as in other environments.

The invention was developed specifically for aircraft, although its scope is not necessarily so limited. It could be used in any environment wherein variable predetermined ratios between input and output motions are desired. For example, speed control for motors (operating a rheostat) for various applications such as an elevator, or machine tools such as automatic screw machines or milling machines, steering control systems for heavy equipment, tape drives and other computer related devices, and the like.

Another advantage of the invention is its feature of positive drive. That is, the relationship between the arrowhead cam and the follower is such that the arrowhead will always move the follower regardless of the condition of the feel spring which normally biases the invention linkage.

BRIEF DESCRIPTION OF THE DRAWINGS

The above and other advantages of the invention will be pointed out or will become evident in the following detailed description and claims, and in the accompanying drawing also forming a part of the disclosure, in which

DETAILED DESCRIPTION OF THE DRAWINGS

Figure 1:
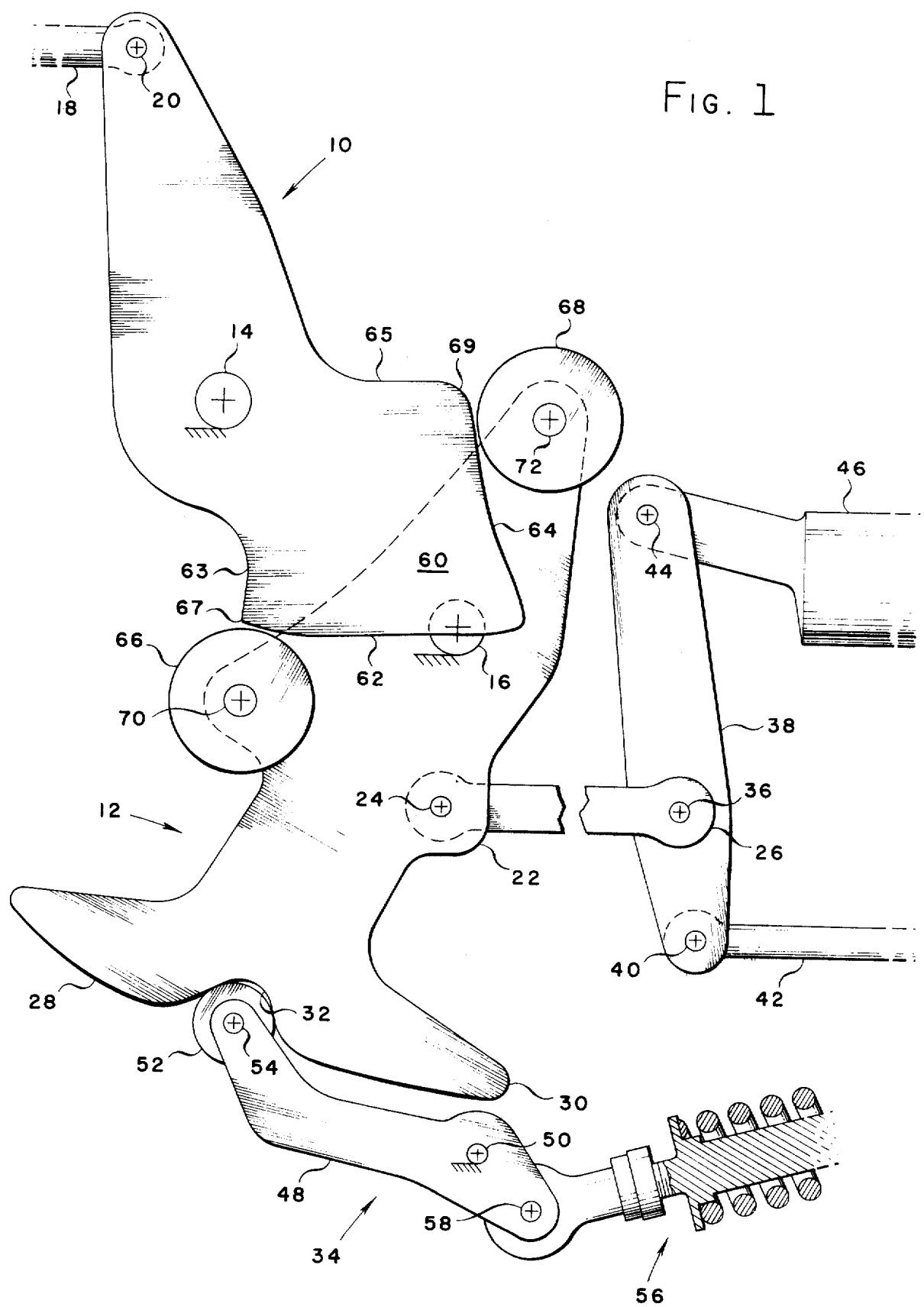
FIG. 1 is a view of a linkage embodying the invention in an aircraft control system.

Referring now in detail to FIG. 1, the linkage comprises an arrowhead cam 10 and a follower member 12. Cam 10 is pivoted at 14 and member 12 is pivoted at 16. The conventions in the drawing are to indicate a floating pivot point by a cross or an X in a circle, and a fixed pivot point by this symbol plus the hash or slash marks shown to indicate that the pivot is fixed. The invention linkage could be housed in a suitable enclosure, not shown, as in an aircraft servo actuator. The entire enclosure could be full of oil to facilitate the motion of the parts, and suitable seals would be provided as required where a member exits from the enclosure. The dotted line circle around pivot 16 indicates a bearing or the like associated with that pivot, and other low friction bearings would be provided as needed, but are not shown.

A link 18 connects to the input end of arrowhead cam 10 at a pivot 20. Link 18 carries the input control motions to the invention linkage. The word "linkage," as used in the specification and claims herein, in regard to part 18 and other parts below, shall be understood to include all such devices and members, such as control cables, push rods, crank arms, chains, and the like, as are found in aircraft and other environments in which the invention might be used. In aircraft, link 18 would eventually connect to the pilot's control stick or other primary controls at the flight deck. The invention is adaptable to operate any aircraft control surface, but is particularly intended for flaps and elevators to control the pitch of the aircraft.

The pivot points shown (particularly points 20, 24, and 14 and 16) are exemplary only; for example, point 20 could be on the same side as pivot 14 on the arrowhead portion. Similarly, point 24 could be located anywhere on the follower 12. Pivots 70 and 72 must be located in position to cooperate with the arrowhead cam, but otherwise can be anywhere on follower 12. A corollary consideration is the "stacking" of the parts; i.e., the locations of the parts with respect to each other into the "depth" of the paper. That is, as shown, part 38 is under link 26 which is in turn under follower 12, etc. The primary consideration in this regard is that the parts be located so that their motions will not interfere with each other.

The member 12 also comprises a pair of elongated lobes 28 and 30 which are shaped in any predetermined manner to provide the predetermined desired feel force at the input link 18. These lobes 28 and 30 are shown more or less symmetrical in the drawing because this is the form they took in the prototype invention which was successfully constructed. Feel simulator means 34 cooperates with the portions 28, 30 and the central depression or detent 32 between the lobes 28 and 30. Detent 32 defines the linkage neutral position by tending to bias the parts back to this position when member 12 is rotated in either direction away from neutral via the spring force on the lobes 28 and 30.

In an aircraft, the output of the invention linkage will control a power servo which in turn operates the flight control surface. Such servos are very well known, and need not be described any further herein. The opposite end of link 26 is shown connected to a typical servo input and feedback walking beam 38, with pivot 44 being connected to the servo cylinder piston rod 46 and pivot 40 connected to link 42 which in turn is connected to the servo control valve. The ratio of walking beam length between pivot 36 and pivot 44 relative to total beam length between pivot 36 and pivot 40 is determined by the feedback loop requirements of the servo. The length between pivots 36 and 44 is usually two or more times greater than the length between pivots 36 and 40. This ratio is conventional in servos, and need not be any further described herein.

The invention is fully adaptable to operation with conventional automatic pilots and the like means to automatically control an aircraft because such means traditionally are connected to the servo control valve rod 42. Thus, automatic aircraft control bypasses the invention linkage. In other environments, other control means could be connected in parallel to the invention linkage, for example, at points 20 or 14.

The feel means 34 comprises a pressure arm 48 which is fixedly pivoted at 50 and carries a roller 52 pivoted at 54, which roller cooperates with the parts 28, 30 and 32 of member 12. On the other side of fixed pivot 50 a conventional spring pressure assembly 56 is pivoted at 58 to arm 48. The showing in the drawing is exemplary only; other arrangements could be dictated by good engineering practice in other environments. Thus, the spring force of assembly 56 drives the roller 52 against parts 28, 30 and 32 to provide the resistance, feedback, or "feel force" back to the pilot via link 18.

Figure 2:
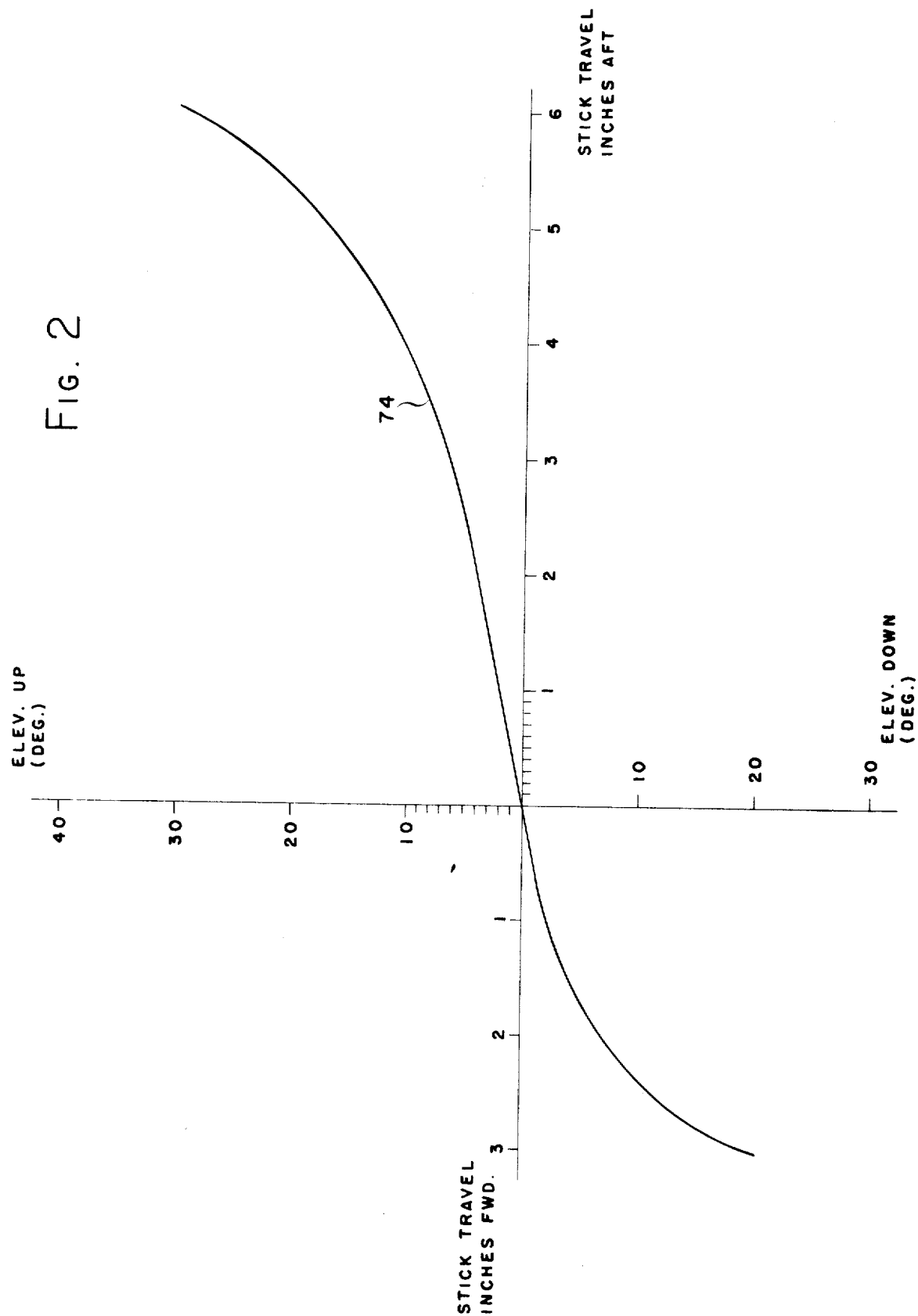
FIG. 2 is a curve produced by the configuration and shapes of the linkage of FIG. 1 showing the predetermined response of output motion to input motion.

The arrowhead portion 60 of cam 10 is made up of a pair of cam surfaces 62 and 64 of predetermined configuration and length with respect to the other parts and to each other. The slightly concave character of surface 64 and the slightly convex character of surface 62 are instrumental in producing the desired output response of link 26 as is shown in FIG. 2 and described below. The angles of these surfaces with respect to the pivot points 14 and 16, and their distances from these points, determines the character of the ratios between the input and output motions, as is shown in the FIGS. 2 and 3 curves. Member 12 carries a pair of rollers 66 and 68 pivoted at 70 and 72, respectively, which cooperate with the surfaces 62 and 64, respectively. Arrowhead portion 60 is further defined by a pair of cutouts or indent portions 63 and 65 which cooperate with the outer ends of the surfaces 62 and 64, respectively, and a pair of points or lobes 67 and 69, to thereby define the arrowhead shape of the portion 60.

These other portions 63, 65, 67 and 69 are for clearance and smooth operation only. The response curve is defined solely by the surfaces 62 and 64. The clearances are such that the roller opposite the roller which is on one of surfaces 62 and 64 does not interfere with the arrowhead cam. That is, only one roller is being driven by the cam 10 at any one time.

An important advantage of the invention linkage is its positive drive. When cam 10 is rotated clockwise away from neutral position about its pivot 14, cam surface 62 contacts roller 66 driving member 12 in a counter-clockwise direction. At the same time roller 68 moves over cam surfaces 69 and 65 without actually touching or lightly contacting the cam surfaces. The clearance is held to a minimum consistent with standard fabrication techniques. When cam 10 is returned to the neutral position roller 66 remains in contact with cam surface 62 due to feel cam reaction force until the neutral position of the feel cam is reached. If the feel cam spring should break and no reaction force was applied, cam surfaces 65 and 69 would contact roller 68 and positively drive follower 12 back to neutral position. Thus, cam 10 positively drives member 12 in either direction even without the reaction spring force of the feel simulator means.

The shape of the indent portions 63 and 65 is such as to match the curvature of motion of the rollers 66 and 68. Arrowhead portion 60 is configured with respect to its rotation about pivot 14 and with respect to the movement of member 12 about its pivot 16 such that the arrowhead 60 is always snugly held between the rollers 66 and 68. That is, for example, if a motion to the left should be applied to link 18, then cam 10 will rotate counterclockwise in FIG. 1, roller 66 will coact with the point 67 between surface 62 and indent 63 (possibly nesting down into indent 63 if the rotation is great enough), while roller 68 simultaneously rolls along the surface 64. If the motion to 18 is in the opposite direction to produce a clockwise rotation of the cam, then the opposite result will obtain, roller 66 moving along surface 62 and roller 68 rolling on the point 69 between part 64 and 65 or nesting into indent 65.

Figure 3:
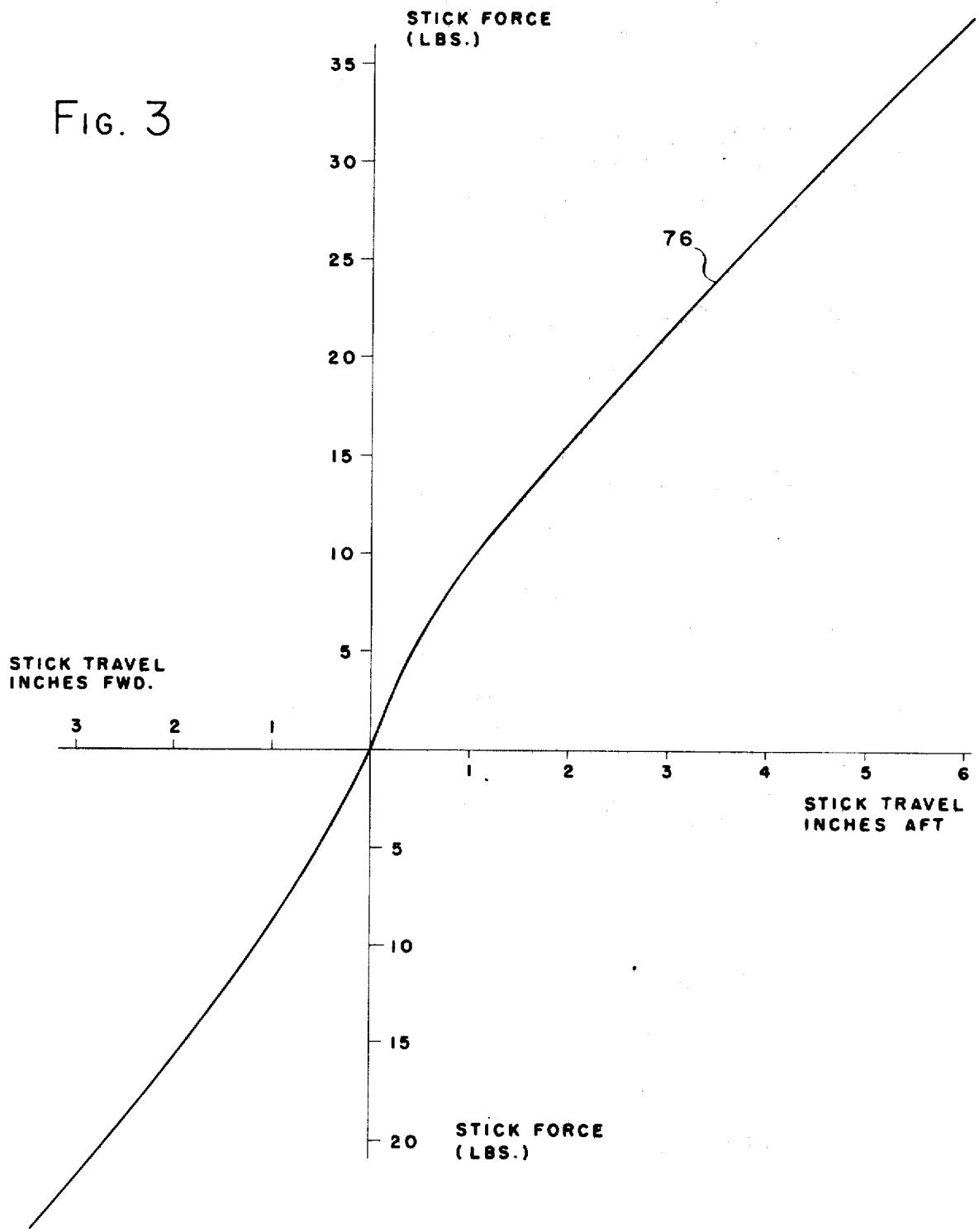
FIG. 3 is a curve similar to FIG. 2 illustrating the feedback or feel force curve over the range of input motion.
Figure 4:
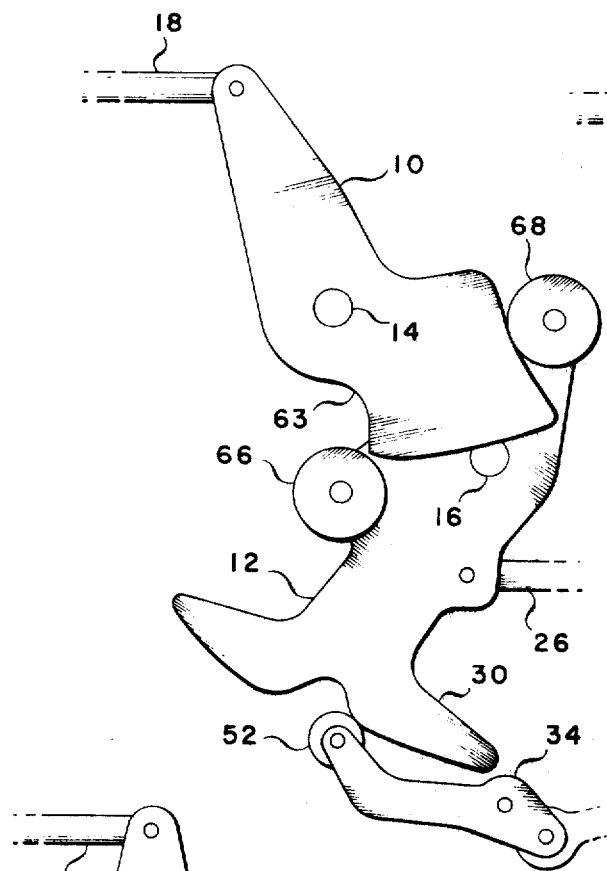
FIGS. 4, 5, 6 and 7 are reduced size "action views" showing other positions of the linkage of FIG. 1.
Figure 5:
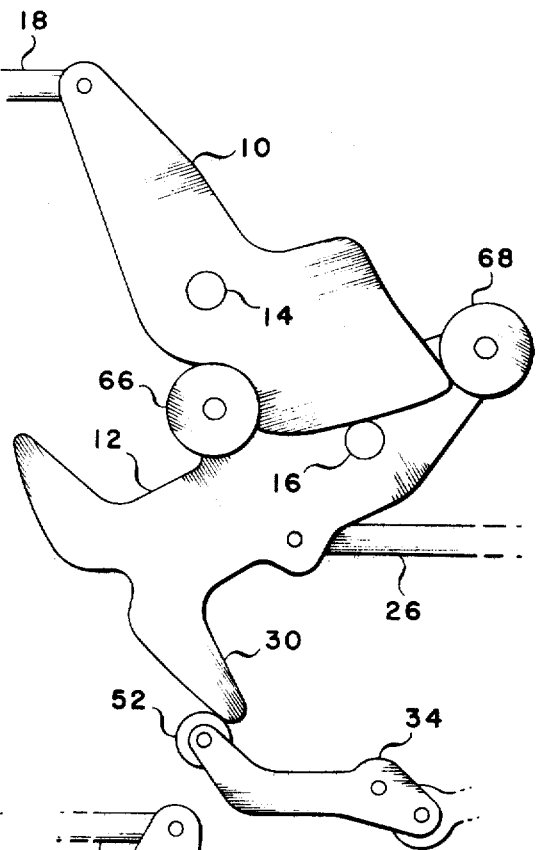
Figure 6:
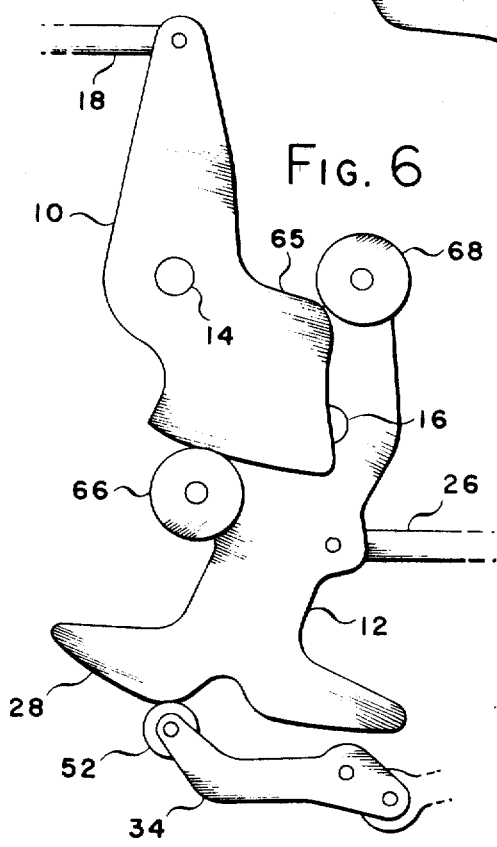
Figure 7:
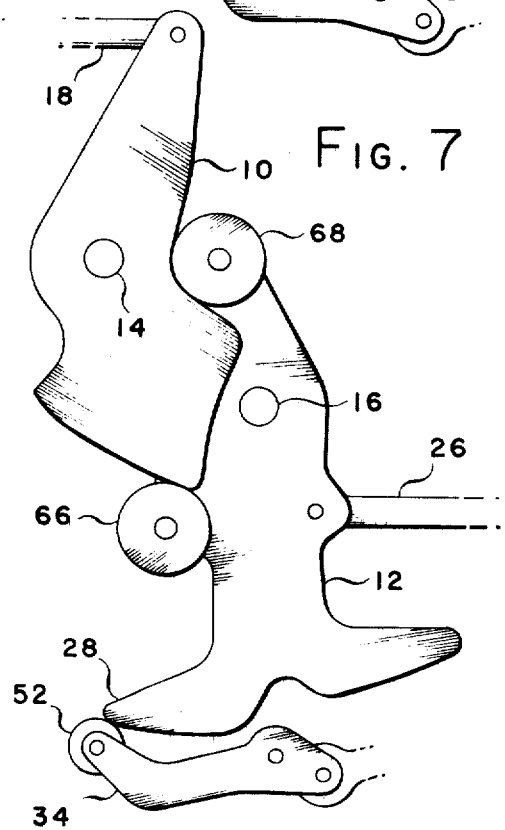

The surfaces defining the bottom of flanges 28 and 30 are cam surfaces about pivot 16 as a center, thus providing the proper predetermined feedback force at input link 18 as shown in FIG. 3.

The specific configurations of the parts shown in FIG. 1 are exemplary only, and have been drawn as shown mainly for purposes of convenience in fitting them onto the sheet. For example, the input end or side of cam 10 between pivots 14 and 20 could have virtually any angular relationship to the arrowhead portion 60. In the same manner, the feel portion 28, 30 and 32 of member 12 could have virtually any angular relations with respect to the operating end carrying rollers 66 and 68. The lobe 22, which is the output point of the invention system, could be variously located on member 12. The several members could be located in different planes. That is, for example, pivot 14 could actually be a jack shaft or rock shaft, and the two portions of cam 10 could thereby be located in different planes. This might be desirable, for example, since it might be easier to form a fluid tight seal around such a rock shaft "14" rather than the operating link 18. Similarly, member 12 could be made up of several pieces.

Referring now to FIG. 2, the curve 74 was produced from a prototype of the invention built in accordance with the embodiment of FIG. 1. The X-axis, as indicated, shows the input motion at link 18 in terms of inches of stick travel forward and aft of a neutral position. The Y-axis shows the motion of the output link 26 in the form of angular elevator motion up and down with respect to a neutral position. As is evident, this angular rotation is directly proportional to either the rotation of member 12 about pivot 16 or linear translation of link 26.

The curve 74 shows, in the upper right quadrant, that as the pilot causes the aircraft to climb (stick aft), the roller 66 cooperates with the convex surface 62, thus producing a relatively long low gain ratio up to about 3 inches of stick travel. That is, relatively large amounts of stick travel produce relatively little elevator motion, thus simplifying keeping the aircraft in trim during cruise. Beyond 3 inches of stick travel aft, the gain increases dramatically and relatively little stick travel produces a relatively large elevator deflection, thus facilitating takeoff of the aircraft. In the lower left quadrant, the stick forward response is shown, and this part of the curve is similar to the stick aft portion, with the exception that the low gain portion extends only to about 1 inch of stick forward travel. This is caused by the slightly concave shape of the surface 64 on arrowhead 60. Thereafter, beyond 1 inch stick forward, the curve 74 falls off rapidly producing a high gain situation to facilitate landing of the aircraft. This reverse "S" response curve sums up the advantages of the invention with respect to prior control linkages in aircraft. Such a shaped response curve is not heretofore known to exist with conventional linkage.

In this regard, the background of the invention is of interest. A curve very similar to the curve 74 of FIG. 2 was produced by a computer simulation to represent the idealized pilot preference for aircraft control. Thereafter, working from this simulated curve, the linkage of FIG. 1 was produced, and that linkage in turn produced the curve 74 of FIG. 2. The curve 74 of FIG. 2 is of the same shape, and in fact is essentially identical to, the idealized computer generated curve.

FIG. 3 has the same X-axis as FIG. 2, and shows stick force on the Y-axis. The notable point is that the curve 76 of this figure is almost a straight line at about 45°. This curve is produced by the feel mechanism comprising the portions 28, 30, 32 and 34. It is desirable, from a human engineering point of view, that the pilot feel a constantly increasing feedback force as he moves the stick further and further from the neutral position. Feel force is always positive and is shaped to suit pilot preference. The curve shown is a typical curve. The slope through neutral could be made less than the rest of the curve, if desired.

Referring now to the action views of FIGS. 4 through 7, an intermediate position and the extreme position in the two directions from the neutral position of FIG. 1, are shown. The reason for the asymmetry of the arrowhead portion 60, in view of the above explanation and the curves of FIGS. 2 and 3, is now manifest. The purpose, very briefly, is to produce the different response of one side with respect to the other, as shown in FIG. 2. The versatility of the invention is now better illustrated, in that it is readily apparent that with only slight changes in the configurations and locations of the various parts, that a virtually limitless variety in the shape of the response (FIG. 2 type curve) can be produced.

While the invention has been described in detail above, it is to be understood that this detailed description is by way of example only, and the protection granted is to be limited only within the spirit of the invention and the scope of the following claims.

I claim:

1. In a control linkage for controllably converting an input signal to a variable output signal, the improvement comprising:
   a dual driving surface cam for providing an input signal and secured for pivotable movement;
   a follower secured for pivotable movement for providing a variable output signal responsive to said input signal,
      said follower having dual follower surfaces and a neutral position,
      said dual follower surfaces being contactable by the respective driving surfaces of said cam,
      one said follower surface being located upon each side of said neutral position;
   whereby output motion of said follower in response to input motion of said cam is chartable as an inverted S-shaped curve asymmetrical about the origin, such curve having a relatively low gain portion of response close to the origin on both sides of the origin and a contiguous smoothly connected and smoothly curving, rapidly increasing gain portion at each of its extremities after the low gain portions on both sides of the origin; and
   feedback force means comprising
      a pair of lobes on said follower remote from said follower surfaces and extending opposite one another, one to each side of a neutral position substantially centrally thereof,
      a depressed detent in said follower member at said neutral position,
      a spring-loaded roller separate from and pivotably mounted adjacent said lobes and normally urged into said detent,
      whereby the shapes of said lobes define the nature and extent of an increasing feedback force at said cam in response to increasing motion of said cam away from a neutral position in said linkage.

2. The control linkage of claim 1 wherein: said cam has a generally arrowhead shape, said dual driving surfaces comprising the leading edges of said arrowhead shape.

3. A linkage comprising an arrowhead cam pivoted at a first point and a follower member pivoted at a second point, said arrowhead cam comprising an arrowhead shaped portion having a first cam surface and a second cam surface, said follower member comprising first and second follower means cooperable with said first and second cam surfaces respectively, the spacing of said first and second pivot points and of said first and second follower means being such that rotation of said arrowhead cam in a first direction causes one of said surfaces to cooperate with its respective follower means while said second surface is inoperative to move its follower means, whereby said follower member moves in response to motion of said cam in said first direction, and rotation of said arrowhead cam in a second direction causes the other of said surfaces to cooperate with its respective follower means while said first surface is inoperative to move its follower means, and whereby said follower member moves in response to motion of said cam in said second direction.

4. The combination of claim 3, and control motion input means connected to said arrowhead cam.

5. The combination of claim 4, said control motion input means comprising a link pivoted to said arrowhead cam.

6. The combination of claim 3, and output motion means connected to said follower member.

7. The combination of claim 6, said output motion means comprising a feedback loop of a servo having an actuator rod and a control valve rod, said feedback loop comprising a walking beam interconnecting the actuator rod and the control valve rod of said servo, and link means pivotably connecting said output motion means to said follower.

8. The combination of claim 3, each of said follower means comprising a roller pivoted on said follower member.

9. The combination of claim 7, and feel simulator means cooperable with said linkage.

10. The combination of claim 9, and an indented detent means in said follower, said feel simulator means comprising a spring-loaded roller which is urged into contact with said detent means, whereby an increasing feedback simulated feel force is provided at said input portion of said arrowhead cam in response to increasing motion of said arrowhead cam away from a neutral position of said linkage.

11. The combination of claim 10, said simulator means of said follower member comprising a pair of elongated lobes extending one to each side of a neutral position defined by said detent in said follower member, said spring-loaded roller is normally nested in said detent to further define said neutral position, and said lobes, including cam surfaces shaped for cooperation with said spring-loaded roller as said follower member moves to either side of the neutral position, whereby the shape of said lobe cam surfaces determines the feedback simulated feel force.

* * * * *